United States Patent
Baker

[15] 3,659,396
[45] May 2, 1972

[54] SEED SHEETS

[72] Inventor: Eric William Baker, Bourne Hill Nursery, Worthing Road, Horsham, Sussex, England

[22] Filed: May 4, 1970

[21] Appl. No.: 34,427

[52] U.S. Cl. .................................53/180, 47/50, 221/211
[51] Int. Cl. .......................................................B65b 9/02
[58] Field of Search ..................53/28, 180; 221/211; 47/56

[56] References Cited

UNITED STATES PATENTS

| | | | |
|---|---|---|---|
| 3,445,981 | 5/1969 | Hori | 53/180 X |
| 3,415,577 | 2/1947 | Bushue | 221/211 X |
| 3,561,187 | 2/1971 | Rohnert et al. | 53/28 |
| 3,294,045 | 12/1966 | Kelley et al. | 47/56 X |

FOREIGN PATENTS OR APPLICATIONS

| | | | |
|---|---|---|---|
| 724,498 | 2/1955 | Great Britain | 221/211 |
| 617,040 | 1/1949 | Great Britain | 47/56 |

*Primary Examiner*—Theron E. Condon
*Assistant Examiner*—Eugene F. Desmond
*Attorney*—Cullen, Settle, Sloman & Cantor

[57] ABSTRACT

Two overlying sheets of porous material, with seeds contained therebetween, are adhered to each other in a manner defining a plurality of pockets that are arranged in parallel equi-spaced columns and rows, there being at least one seed in each pocket.

The seed sheets are made by causing the seeds to be held in a plurality of positions defining equi-spaced parallel rows and columns on a surface of first one of said sheets, covering the seeds with the second one of said sheets, and adhering the sheets to each other around said plurality of positions whereby to form said pockets. The seeds may be held against the first sheet by suction. The sheets may be caused to adhere together by passing them between rollers that press the sheets together at locations where they are intended to adhere to each other.

An apparatus for making these seed sheets comprises a rotatable suction drum that is provided in its surface with a plurality of perforations arranged in equi-spaced parallel rows and columns, the drum being positioned above a tray for the seeds. A line of spaced-apart rods, that are vertically reciprocable in unison, extend upwardly through the seed tray. The movement of the rods is so synchronized with the rotation of the perforated drum that when the rods reach the limit of their upward stroke, each rod will have its upper end aligned with, and in close proximity to, an associated one of the perforations of a column in said drum, there being one rod for each of the perforations in a column.

Parallel with the perforated drum is a shaft carrying a plurality of rotatable rollers, there being one roller for each of the rows of perforations in the drum. The rollers define with said drum a plurality of nips in the region of the rows of perforations.

In operation seeds are poured into the tray, and the first sheet of porous material is fed from a first supply source to the underface of the suction drum and thence around the drum to pass between the drum and the plurality of rotatable rollers. The second sheet of porous material is fed from a second supply source to the nip between the rollers and the drum. The reciprocating rods at their lowermost setting dip below the level of the upper surface of the seeds in the tray. On their upward stroke, each of the rods lift one or more seeds from the tray and presents said seed or seeds to the first porous sheet where they are held by the suction in the drum. As the drum rotates the seeds on the first sheet are eventually covered by the second sheet, the two sheets being bonded together around the seeds by the pressure between the nip rollers and the drum.

3 Claims, 6 Drawing Figures

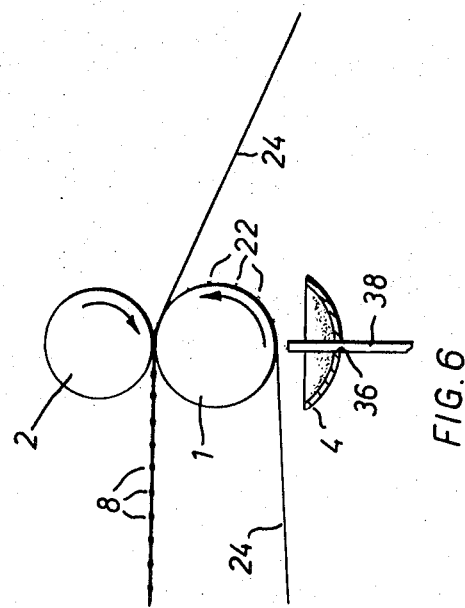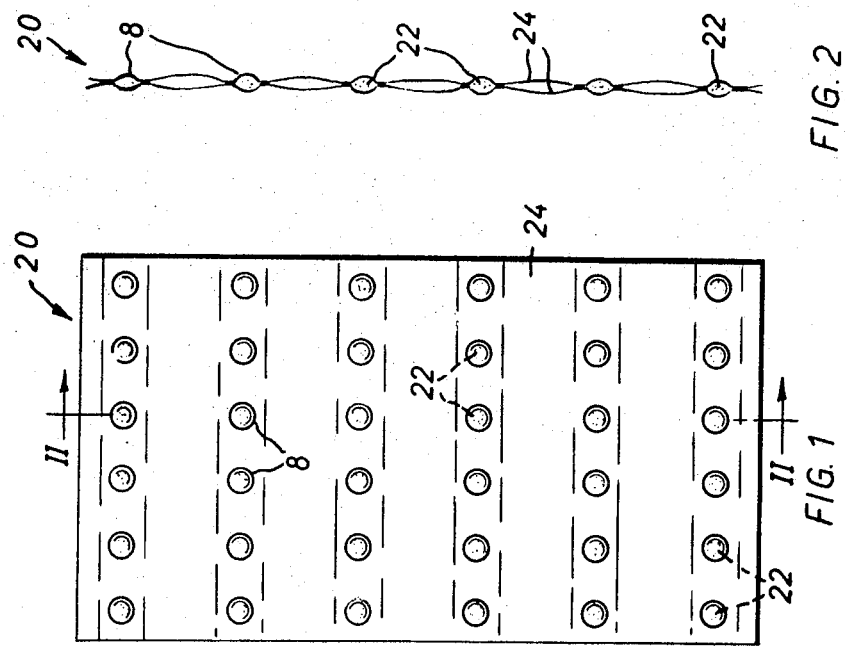

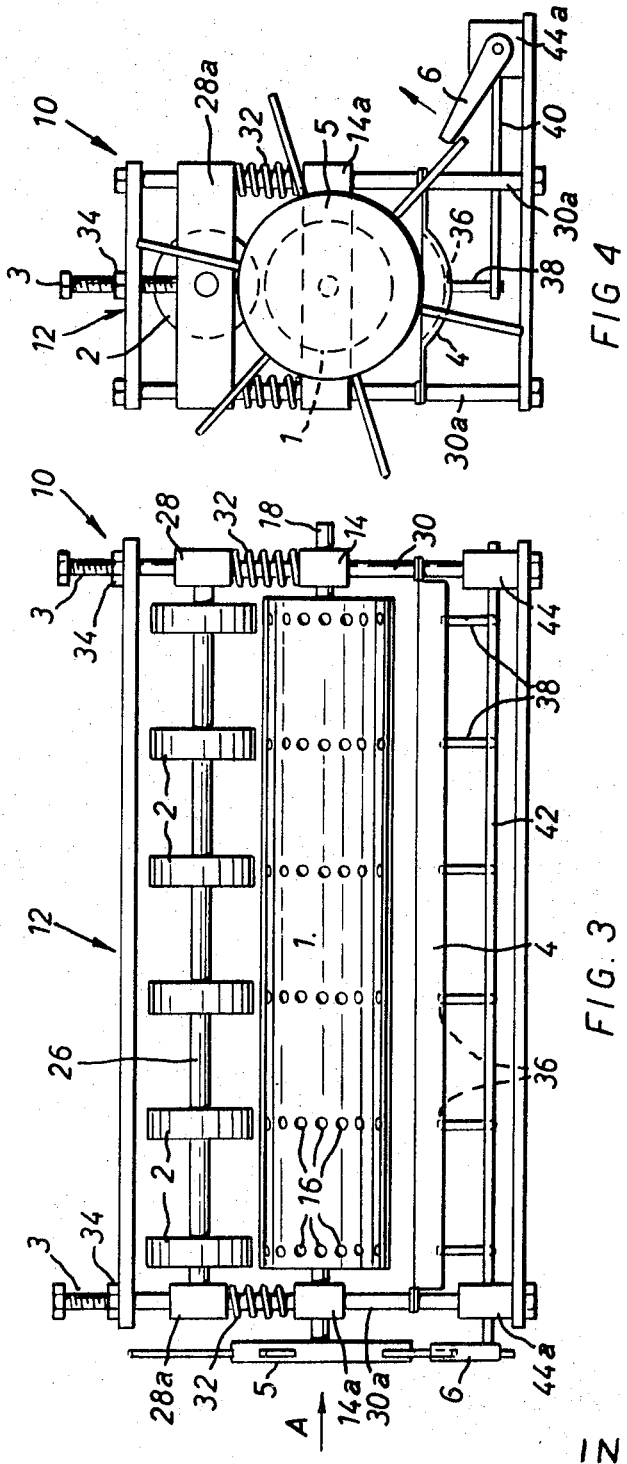

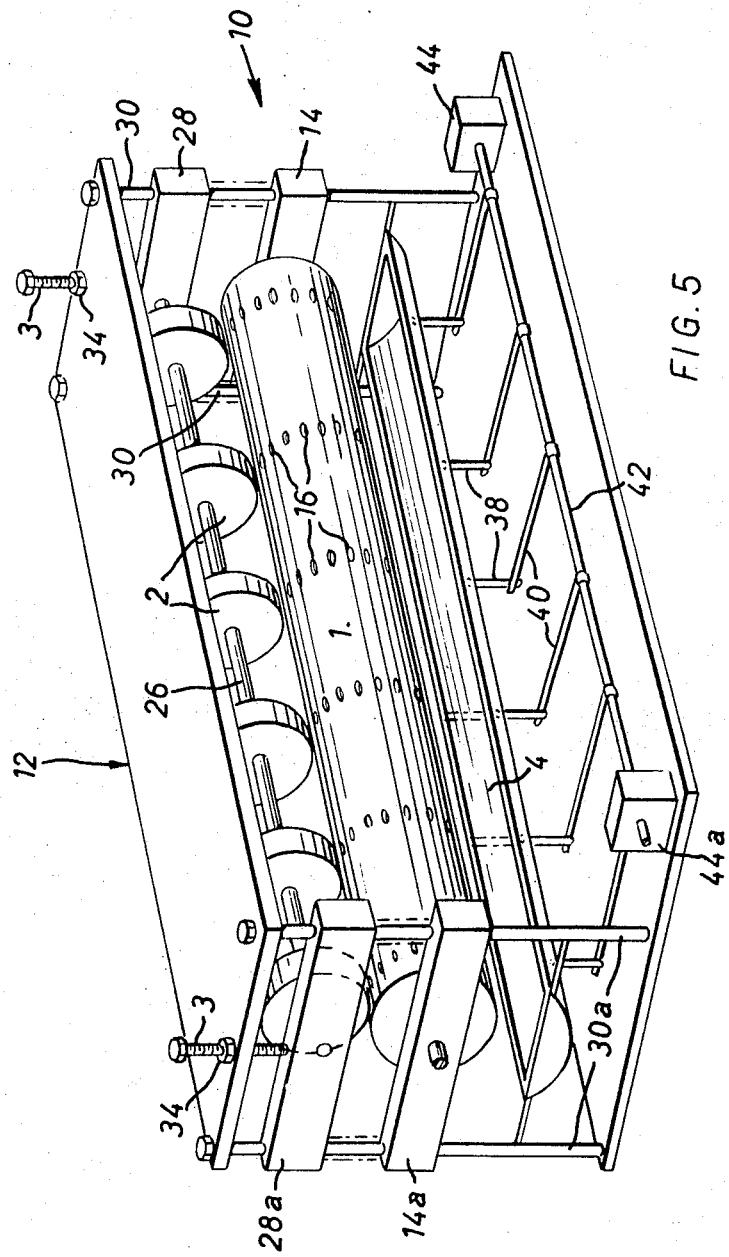

SEED SHEETS

BACKGROUND OF THE INVENTION

1. Field of the Invention

The present invention relates to the provision of porous sheets with the housing of seeds therebetween; and the provision of apparatus for positioning seeds between said sheets and securing said sheets together around the seeds.

2. Description of the Prior Art

It is known to sow seeds by hand in seed boxes to obtain seedlings which are then transferred to bedding boxes to produce bedding plants. This transfer of the seedlings from the seed boxes to the bedding boxes is necessary since hand sowing is usually uneven and causes overcrowding of the seedlings in parts of the seed box. Hand sowing is time consuming as is the transplanting of the seedlings from the seed boxes to the bedding boxes.

In order to overcome some of the disadvantages of hand sowing seeds, seed strips and seed sheets are known in which seeds are held between strips or sheets of woven material. The strips or sheets are placed in seed boxes together with earth and other materials suitable for plant growth. These known seed sheets overcome some disadvantages of hand sowing but the seeds between the sheets are not evenly spaced with the result that overcrowding of the plants can still take place, and transplanting of the seedlings from the seed boxes to the bedding boxes is still necessary.

SUMMARY OF THE INVENTION

According to the present invention, a seed sheet comprises two overlying sheets of porous material, portions of one sheet adhereing to adjacent portions of the second sheet, the adhering portions defining a plurality of pockets, the pockets being arranged in parallel equi-spaced columns and rows and at least one seed cotained within each pocket.

Preferably, the porous material is paper and the portions are adhered together by pressure adhesion.

According to a further aspect of the invention, a method of making a seed sheet comprises the steps of holding a plurality of seeds in a plurality of positions arranged in equi-spaced parallel rows and columns against a surface of a first sheet of porous material, covering the seeds with a second sheet of porous material and adhering adjacent portions of the first sheet to the second sheet around the positions to form pockets for the seeds.

Preferably, the seeds are held against the surface of the first sheet by suction. Advantageously, the adjacent portions adhere together by passing them between rollers.

According to a still further aspect there is provided an apparatus for making a seed sheet comprising a rotatable suction drum provided in its cylindrical surface with equi-spaced parallel rows and columns of perforations, a shaft carrying a plurality of rotatable rollers defining with said drum a plurality of nips in the regions of the said perforations, means for supplying a sheet of porous material to said drum, means for supplying seeds to said sheet in the locations of said perforations before its passage through said nips, and means supplying a further said sheet over said first sheet before its passage through said nips but after said seeds have been supplied thereto.

DESCRIPTION OF THE DRAWINGS

FIG. 1 is a plan view of a sheet of the invention;

FIG. 2 is a cross-section on the line II—II of FIG. 1;

FIG. 3 is a front elevation of apparatus for producing seed sheets;

FIG. 4 is a side view of the apparatus of FIG. 3 in the direction of arrow A;

FIG. 5 is a perspective view of the apparatus of FIG. 3 with some parts ommitted for clarity; and FIG. 6 is a sketch showing the relative movements of the sheets of porous paper and the seeds when passing through the apparatus.

DESCRIPTION OF THE DRAWINGS

As shown in FIGS. 1 and 2, a seed sheet indicated generally by reference numeral 20 comprises a pair of sheets 24 of porous paper pressed together such that portions of each sheet 24 adhere to adjacent portions of the other sheet 24 of the pair. The adhering portions define a plurality of pockets 8 between the sheets 24, each pocket 8 containing at least one seed 22. The pockets are arranged in parallel equi-spaced columns and rows.

Referring now to FIGS. 3 to 6, there is shown an apparatus 10 for producing seed sheets 20. The apparatus comprises a framework 12 in which is supported a hollow cylindrical drum 1 supported at either end in bearings mounted on side members 14, 14a of the framework 12. Drum 1 is provided with rows of holes 16, the holes 16 of each row being equi-spaced about the circumference of the drum 1, the rows being parallel and equi-spaced along the length of the drum 1. The holes 16 communicate with the interior of the drum 1. At one end of the drum 1 is an outlet 18 which is adapted for connection to a vacuum pump (not shown). The opposite end of drum 1 is connected to a spoked wheel 5 provided on the opposite side of side member 14a. The drum 1 and spoked wheel 5 rotate together.

A roller shaft 26 is provided between side members 28, 28a, above drum 1. The vertical position of the side members 28, 28a on the end members 30, 30a of framework 12 is adjustable by means of adjustment bolts 3. Springs 32 urge the side members 28, 28a against the adjustment bolts 3 and locknuts 34 are provided for locking the adjustment bolts 3 in position. Rollers 2 are fixedly attached to the roller shaft by means of a rubber bush. Each roller 2 is vertically aligned with a row of holes 16.

Below drum 1, there is provided a seed tray 4 mounted in the framework 12. The seed tray 4 has a series of holes 36 along its base, each hole 36 being vertically aligned with a row of holes 16. Through each hole 36 there passes into the seed tray 4, a rod 38. Each rod 38 is connected at its end below the seed tray 4 to one end of a connecting rod 40 which at its other end is connected to a rocker shaft 42. The rocker shaft is mounted between bearings 44, 44a. At one end of rocker shaft 42 beyond bearing 44a there is attached an arm 6 which extends into the path of movement of the spokes of the spoked wheel 5.

When the arm 6 is free from engagement by a spoke, the position of the upper end of each rod 38 is substantially level with the inside surface of the base of the seed tray 4.

On preparing the apparatus for operation, the the position of the shaft 26 and rollers 2 are first adjusted relative to drum 1 by means of adjustment bolts 3. Seed tray 4 is filled with seeds, and a vacuum pump is connected to outlet 18. Finally thin porous paper from a first reel (not shown) is passed between the drum 1 and rollers 2 and thin paper from a second reel (not shown) is passed around the drum 1 (see FIG. 6).

In operation, the drum 1 is rotated by means (not shown) and as a hole 16 in each row approaches a position above its corresponding rod 38, a spoke on wheel 5 engages arm 6 to rotate the arm clockwise as seen in FIG. 4. Rotational movement of arm 6 clockwise is translated via rocker shaft 42 connecting rods 40 into substantially vertical movement of the rods 38. The rods 38 rise through the seeds in the tray 4 and carry one or more seeds on their upper ends. When the rods 38 reach their uppermost position, their corresponding holes 16 are immediately above them and the seeds are sufficiently near to the drum 1 to be sucked from the ends of the rods 38 onto the thin paper from the second reel (not shown). The seeds 22 are held against the paper adjacent holes 16 by suction as they rotate with the drum. The seeds are then covered by the paper from the first reel (not shown) and both papers and seeds pass between the drum 1 and rollers 2. 2. The pressure between the co-operating surfaces of the rollers 2 and the surface of the drum 1 around holes 16 causes the paper to adhere together around the holes 16 thereby forming pockets 8 within which the seeds are contained.

The apparatus 10 can produce a continuous seed sheet having equi-spaced columns and rows of pockets each cotaining one or more seeds. The continuous seed sheet can be cut to any suitable length but for bedding plant boxes, sizes of sheet 13 by 8½ inches having 60 pockets at 1¼ by 1½ inches apart are found to be convenient.

The upper ends of the rods 38 may be slightly concave.

Many modifications can be made to the apparatus without departing from the scope of the invention as defined by the claims.

I claim:

1. An apparatus for making a seed sheet, comprising a rotatable drum provided in its cylindrical surface with equi-spaced parallel rows and columns of holes, conduit means in communication with the holes and connectable to a source of vacuum, a shaft carrying a plurality of rotatable rollers, the rollers being aligned with the perforations in a direction axially of the drum and defining with the drum a plurality of nips, means for supplying a sheet of porous material to said drum, a tray below the drum for storing seeds, a plurality of rods aligned with the perforations in a direction axially of the drum and being raisable through the bottom of the tray toward the drum so as to supply seeds to the sheet in the locations of the perforations before its passage through the nips, and means for feeding a second sheet over the first sheet before its passage through the nips but after the seeds have been supplied to the first sheet and retained thereon by the vacuum.

2. An apparatus as defined in claim 1, wherein the said drum carries a spoked wheel, which spoked wheel controls said means for supplying seeds to the said sheet.

3. An apparatus as defined in claim 1, wherein the said shaft and rollers are spring-biased to an adjusted position with respect to the said drum.

* * * * *